United States Patent [19]
Hajjar et al.

[11] Patent Number: 5,627,808
[45] Date of Patent: May 6, 1997

[54] CROSS-TRACK TILT ERROR COMPENSATION METHOD FOR OPTICAL DISC DRIVES

[75] Inventors: Roger A. Hajjar, Fairport; Mark A. Barton, Rochester, both of N.Y.

[73] Assignee: Eastman Kodak Company, Rochester, N.Y.

[21] Appl. No.: 604,234

[22] Filed: Feb. 21, 1996

[51] Int. Cl.⁶ .................................................. G11B 7/09
[52] U.S. Cl. ................................ 369/44.32; 369/44.29; 369/44.35
[58] Field of Search ........................... 369/44.35, 44.36, 369/44.32, 54, 44.29

[56] References Cited

U.S. PATENT DOCUMENTS

| | | | |
|---|---|---|---|
| 4,730,294 | 3/1988 | Funada | 369/44.35 |
| 5,048,002 | 9/1991 | Horie et al. | 369/44.35 |
| 5,251,194 | 10/1993 | Yoshimoto et al. | 369/44.29 |
| 5,351,224 | 9/1994 | Nagata et al. | 369/44.29 |

*Primary Examiner*—Thang V. Tran
*Attorney, Agent, or Firm*—Raymond L. Owens

[57] ABSTRACT

A method for deriving a track offset signal to be applied to a tracking error signal particularly adapted for use with a disc drive having a servomechanism and actuator for positioning a read or write spot on a track of a disc in response to the tracking error signal is disclosed. The method includes determining a signal representation of the focus height as a function of disc radius, and differentiating the focus height signal to derive a cross-track tilt signal, applying the cross-track tilt signal to a transform which produces a track offset signal.

8 Claims, 5 Drawing Sheets

CROSS-TRACK TILT ERROR COMPENSATION METHOD FOR OPTICAL DISC DRIVES

FIELD OF THE INVENTION

The present invention relates to a method for deriving an offset signal to be applied to a tracking error signal for use in an optical disc drive.

BACKGROUND OF THE INVENTION

In optical recording systems an optical beam is focused by an objective lens through a protective layer onto a recording layer of a disc. The objective lens is mounted in an electromechanical actuator which permits control electronics to move it independently along the focus and cross-track direction. Servo electronics utilize feedback signals, developed from the optical beam reflected from the disc, to determine how to accelerate the lens in order to maintain proper focus and tracking.

The quality of recording or retrieving data in many optical recording systems is generally very sensitive to the cross-track position of the recording spot on the medium. In a CD-R system, for example, data quality rapidly deteriorates when the recording or reading spot deviates from the centerline of the disc groove. A commonly-used technique for maintaining a focused spot on-track is referred to as push-pull tracking. The technique involves deriving a push-pull tracking error signal from an interference pattern caused by the interaction of the spot with the groove or other suitable tracking structure on the medium. A tracking servo adjusts the position of the spot to keep the push-pull signal at a predetermined optimum value generally referred to as a "tracking offset" or an on-track value. The tracking offset is typically determined by making a series of trial recordings during a calibration period before actual data is recorded. The tracking offset is intended to compensate for static errors such as detector and optical misalignment as well as electronic offset. However, additional tracking offset correction may be required due to media tilt in the cross-track direction. Media tilt changes from disc to disc and from point to point on a given disc.

Prior art such as the ones described by Horie et al. and Yoshimoto et al in U.S. Pat. Nos. 5,048,002 and 5,251,194, respectively disclose a method to null out the effect of tilt and other non-uniformity across the disc by moving the optical head to a plurality of different radial positions while the tracking servo is open. These radii shall be referred to as calibration radii.

FIG. 1 illustrates an open loop tracking error signal that is actually observed in an operational disc drive at a given calibration radius. The frequency modulation observed in FIG. 1 is caused by the eccentricity of the disc which causes the cross-track velocity to vary sinusoidally with respect to time. FIG. 1 also illustrates the tracking error signal upper envelope 6 and lower envelope 8 levels. From these envelope levels or the peak-to-peak of the open look tracking error signal, an optimum track offset is determined and subsequently applied to the tracking error so that the servo mechanism correctly positions the read or write spot on the track.

Although the calibration technique described in the above prior art compensates for certain disc non-uniformity, it has been observed that it does not fully compensate for cross-track tilt that may be present between the media and the optical head. In other words, the track error offset determined from the upper and lower envelopes of the tracking error signal is not always proportional to cross-track tilt. Therefore, the calibration technique of prior art may be unable to maintain the beam sufficiently on-track in the presence of disc tilt.

A need exists for a tracking offset technique in which a recording beam is maintained on-track as a function of disc tilt.

SUMMARY OF THE INVENTION

An object of this invention is to provide a method for deriving a tracking offset signal (TOS) that is a function of the cross-track tilt between the disc and the optical head in order to be applied to a tracking error signal (TES) and which overcomes the above indicated problems.

It is another object of this invention to provide an improved method for adjusting the tracking offset of an optical servo system when subjected to cross-track tilt.

It is yet another object of the present invention to provide a method of determining cross-track tilt between the optical head and the media.

These objects ares achieved in a method for deriving a track offset signal to be applied to an actuator for positioning a read or write spot on a disc in response to the track offset signal, comprising the steps of:

a) determining a signal representative of the focus height as a function of disc radius;

b) differentiating the focus height signal to derive a cross-track tilt signal; and c) applying the cross-track tilt signal to a transform which produces a track offset signal which is applied to the actuator.

In accordance with the present invention, cross-track tilt is derived from the vertical lens position across the radius of the disc. Specifically, when the focusing servo is closed, the actuator objective lens is maintained at a constant height relative to the surface of the disc. The average current applied to the electromechanical actuator which controls the objective lens in the focus direction is proportional to the objective lens height. The focus height signal is determined by sensing the actuator current in the focus direction. The derivative of the focus height signal with respect to radius a yields cross-track tilt signal. The cross-track tilt signal applied to a tansform signal to calculate a tracking offset signal that is particular to the optical system used.

The present invention is particularly suited to disc drives which may function as a reader, writer, or reader/writer, of optical or magneto-optical discs.

The above and other objects of the present invention will become more apparent when taken in conjunction with the following description and drawings.

DETAILED DESCRIPTION OF THE INVENTION

Tilt in the cross-track direction between the media and the optical head does not lead to optimum tracking conditions once the tracking servomechansim is closed. It is therefore important to compensate for the presence of cross-track tilt by generating an additional tracking offset signal to be added to the tracking error signal. Such tilt-dependent tracking offset may be determined by mapping the disc shape in the cross-track direction as discussed below.

When the focusing servomechanism is active, the objective lens is maintained at a constant height relative to the disc. As is well known, as the disc moves towards the objective lens by a distance, the focusing servo subjects the focusing actuator to a current (I) moving the lens by a distance, thereby improving focus. Provided that the current is proportional to the vertical position of the objective lens relative to a horizontal plane, measurements of the current across the disc should lead to the shape of the disc to within the residual focus position error (which is typically less than 0.1 μm).

Figure 2:
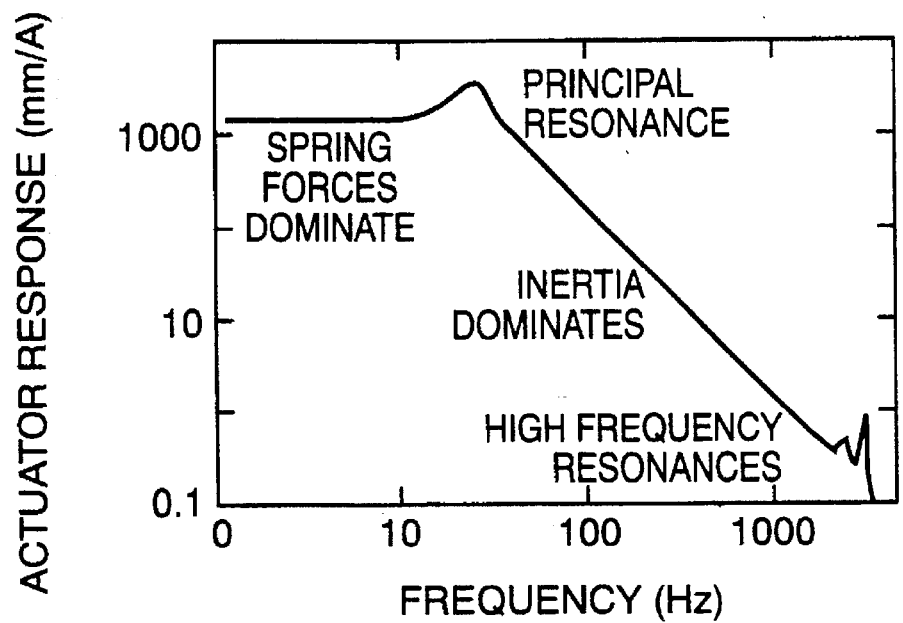
FIG. 2 shows a typical frequency response of an electromechanical actuator which can be used in accordance with the present invention.
Figure 3:
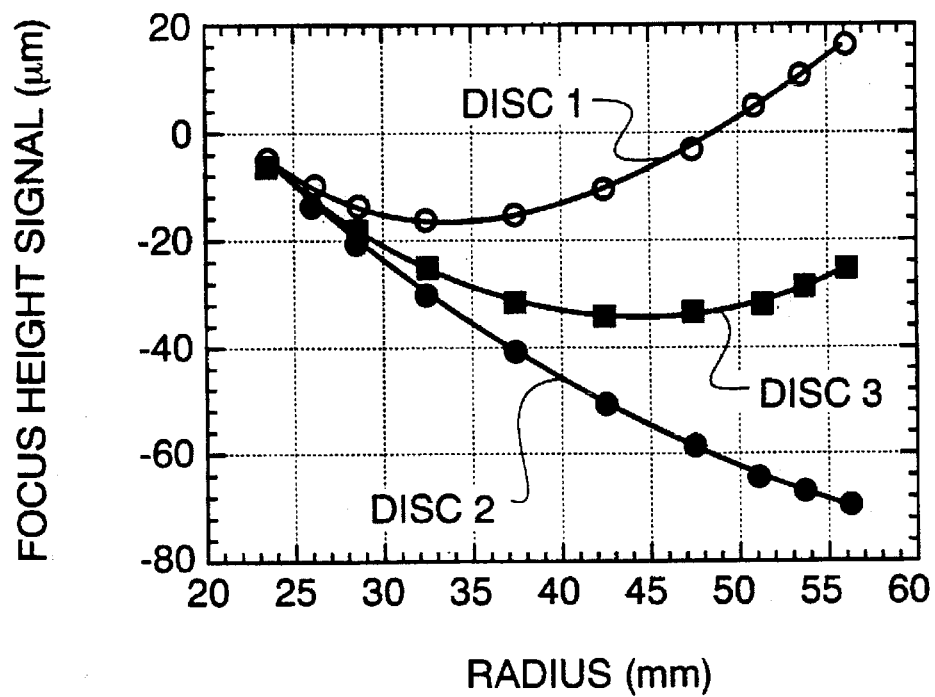
FIG. 3 represents the focus height signal for three different discs measured using the average lens focus actuator current.
Figure 4:
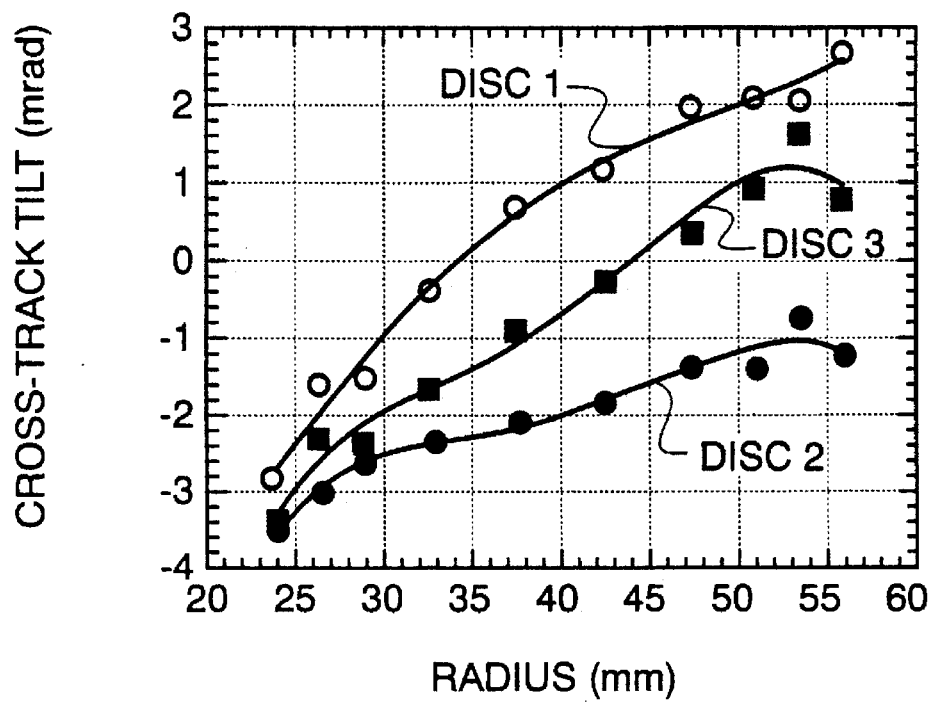
FIG. 4 represents the cross-track tilt signal derived from FIG. 3.

A typical frequency response of a spring-supported actuator is shown in FIG. 2. At low frequency, i.e. below the principal resonance of the focusing actuator, the actuator response is constant. In a typical servo loop, averaged values of current should be, therefore, proportional to vertical lens position. For ease of measurement, the current is usually converted into voltage (V) using a sensing resistor or a current-to-voltage converter. The resulting signal is defined as the focus height signal. FIG. 3 shows the focus height signal for three separate discs as a function of radius in the cross-track direction which was obtained by sensing average voltage (V) values at different radii and converting into distance (μm) using the sensitivity (i.e. W/μm) of the focus actuator. Cross-track tilt signals are shown in FIG. 4 for the discs of FIG. 3 and were obtained by differentiating the focus height signal of FIG. 3 with respect to radius. A cross-track tilt signal is derived from the following equation.

$$Cb=(Vb-Vc)/(Rb-Rc)G1 \qquad \text{Eq. 1}$$

wherein

Cb is the cross-track tilt signal calculated for Rb;

Rb and Re are selected calibration radii where Rb is greater than Re;

Vb is the focus objective lens voltage corresponding to location Rb;

Vc is the focus objective lens-voltage corresponding to location Re; and

G1 is a factor that converts Cb into proper tilt units such as degrees or radians. In normal drive operation G1 can be omitted.

Other numerical methods may be used to calculate Cb as a function of radius such as a window averaging technique or other well known differentiation techniques as will suggest themselves to one skilled in the art.

The cross-track tilt signal (Cb) is then converted to a track offset signal (TOS) which can readily be accomplished using a Look Up Table (LUT) which is generated by optimizing the read and recording track offset signal in an optical system as a function of tilt. The LUT provides a transformation which produces a track offset signal in response to the cross-track tilt signal. The LUT transformation may vary depending on the disc-type or even the location of the disc (e.g inner versus outer radius). In addition to the cross-track tilt signal, the transform use other information such as peak-to-peak of the open loop tracking error signal, or the root mean squared of the open loop tracking error signal, or the slope at the zero crossing of the open loop tracking error signal, or the amplitude of the wobble signal provided the groove on the disc is wobbled, or other factors indicative of the magnitude of the tracking error signal at a given location on the disc in order to produce the track offset signal (TOS).

Figure 5:
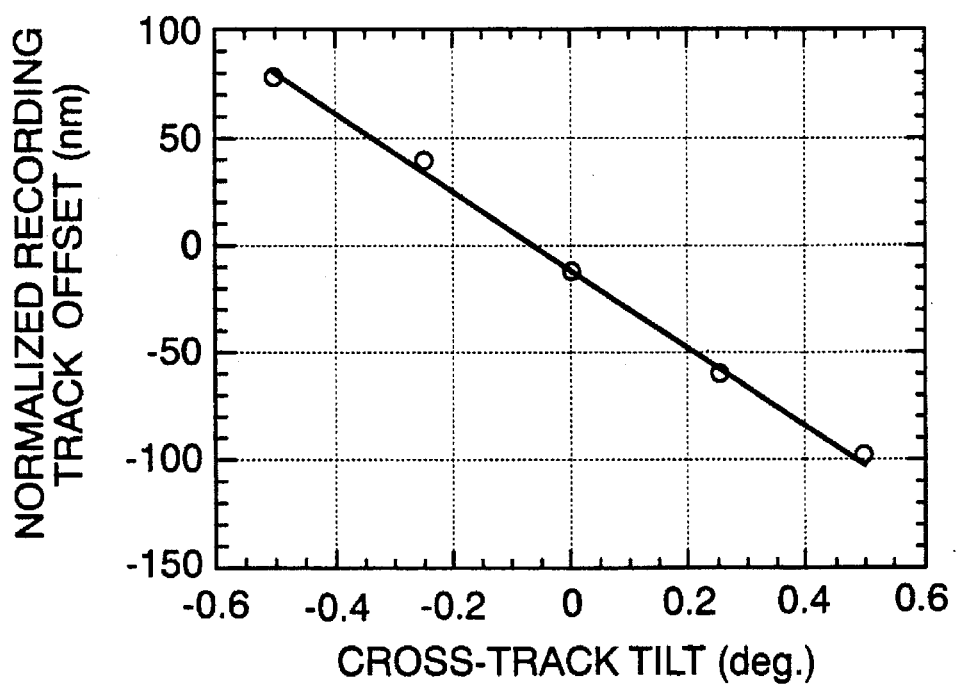
FIG. 5 shows a normalized track offset signal required by an optical disc drive to record on track as a function of cross-track tilt.

For example, FIG. 5 shows the optimum normalized recording track offset required by an optical system to record and read a disc with different tilt cross-track tilt values at a given location. FIG. 5 represents the LUT for this particular optical system. Cross-track tilt values on subsequent discs found using Eq. 1 and peak-to-peak of the open loop tracking error signal are used in conjunction with FIG. 5 to determine the optimum track offset addition.

An example of a normalized track offset signal using the peak-to-peak of open loop tracking error signal is expressed in nanometers or percentage and is calculated as follows:

$$TO=TOS/PP*G2 \qquad \text{Eq. 2}$$

$$PP=(UE-LE) \qquad \text{Eq. 3}$$

wherein

Figure 1:
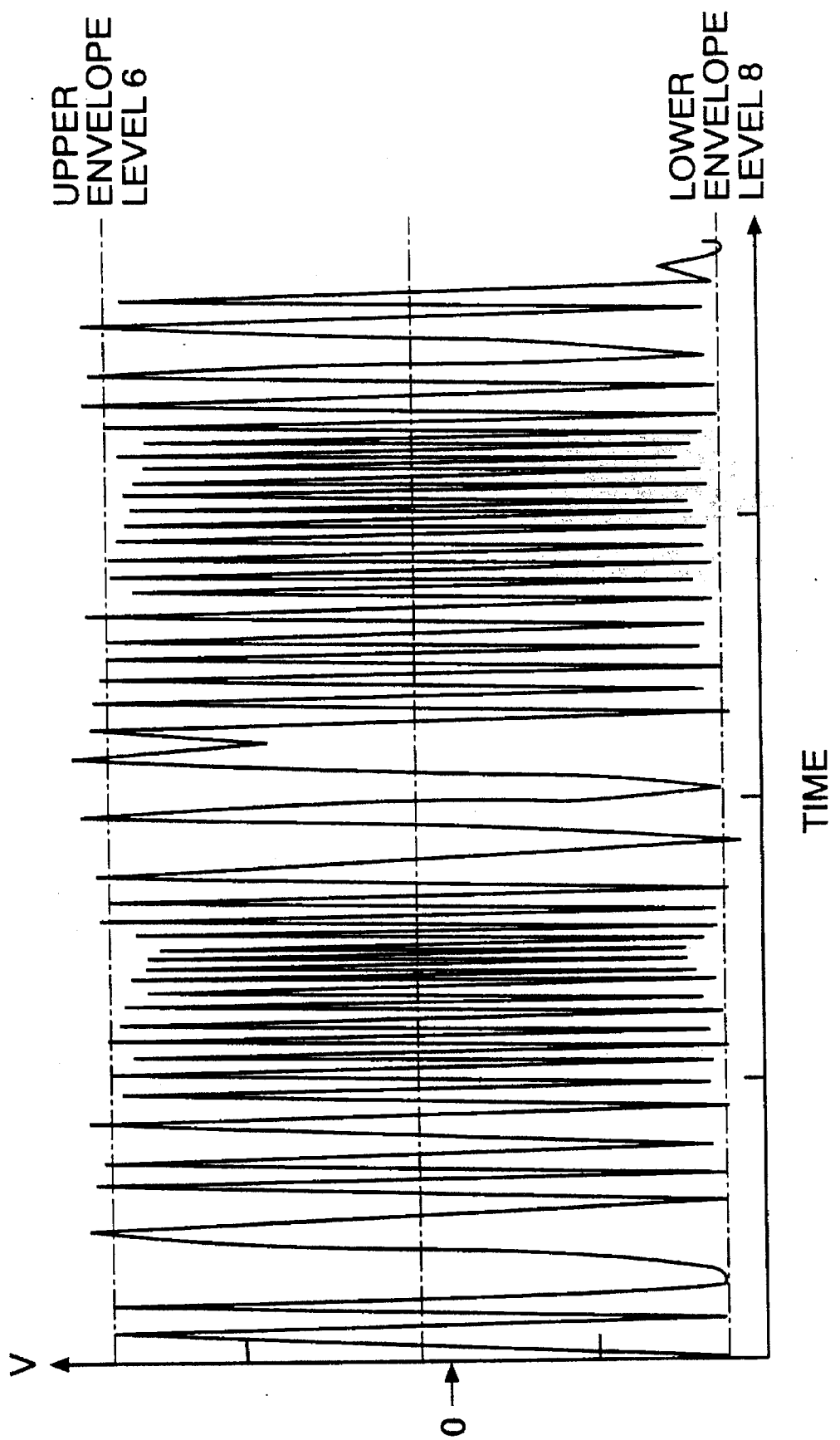
FIG. 1 illustrates a well known prior art open loop tracking error signal for multiple tracks with a sinusoidal cross-track velocity as occurs in a disc drive with a decentered disc.

TO is the normalized track offset signal in nanometers or percentage from the center of the track;

TOS is the tracking offset signal to be added to the tracking error signal in order to move the spot to the center of the track;

PP is the peak-to-peak amplitude (in volts) of the corresponding open loop tracking error signal;

UE is the upper envelope voltage level of the open loop tracking error signal as shown in FIG. 1;

LE is the lower envelope voltage level of the open loop tracking error signal as shown in FIG. 1; and G2 is a factor that converts TO into proper units such as nanometers or percentage. In normal drive operation, G2 can be omitted.

During disc drive operation, the current operating radius and the two nearest calibration radii, are used to interpolate settings of track offset signal by the following sequence steps.

Selecting the nearest two calibration radii where the upper and lower envelopes as well as the cross-track tilt information signal were determined during the preceding procedure, the TOS is determined using the following equations:

$$Cc=(Rc-Ra)/(Rb-Ra) *(Cb-Ca)+Ca \qquad \text{Eq. 4}$$

$$PPc=(Rc-Ra)/(Rb-Ra)*(PPb-PPa)+PPa \qquad \text{Eq. 5}$$

$$TOc=(Cc-Ca)/(Cb-Ca)*(TOb-TOa)+TOa \qquad \text{Eq. 6}$$

$$TOSc=TOc*PPc/G2 \qquad \text{Eq. 7}$$

wherein
- Ra is the nearest calibration radius less than the current radius;
- Rb is the nearest calibration radius greater than the current radius;
- Rc is the current radius;
- Ca is the cross-track tilt signal calculated for Ra;
- Cb is the cross-track tilt signal calculated for Rb;
- Cc is the cross-track tilt signal calculated for the current radius;
- PPa is PP calculated for Ra;
- PPb is PP calculated for Rb;
- PPc is the PP corresponding to the current radius;
- TOa is the TO found for Ca from LUT;
- TOb is the TO found for Cb from LUT;
- TOc is the TO corresponding to Cc; and
- TOSc is the track offset signal required for the current radius.

Figure 6:
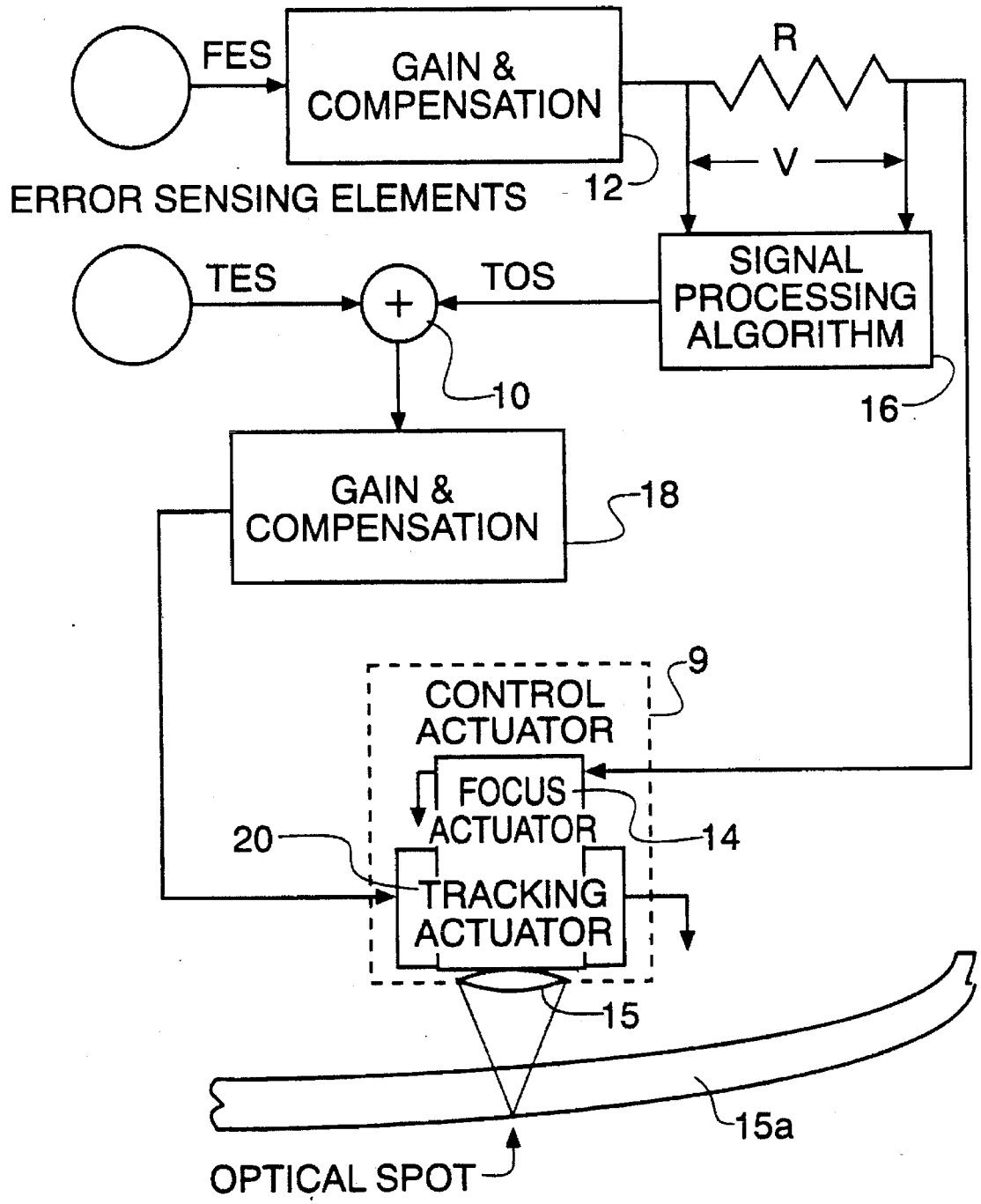
FIG. 6 is a block diagram of a servo electronics of a typical tracking and focus servomechanism which produces a track offset signal in accordance with the present invention.

FIG. 6 is an examplary block diagram of servomechanism of a typical tracking and focus servo for use with an actuator 9 (as shown in dotted lines) and illustrates the operation of the present invention. The tracking error signal (TES) and focus error signal (FES) are generated using conventional optical sensing elements in an optical recording head. TES is provided as an input to an adder circuit 10. The tracking offset signal is also provided as an input to the adder circuit 10. The tracking offset signal is determined as follows. The FES is provided as an input into a gain and compensation circuit 12. The compensation circuit 12 provides an output current I which is delivered to a resistor R and then through a focus control actuator coil 14. The focus controll coil 14, in the actuator will be understood by those in the art to be used to position the objective lens 15 in response to the input current relative at the correct focus height to the surface of a disc 15a. A voltage (focus height signal) is produced across the resistor R and this voltage is applied to a signal processing circuit 16 which includes the LUT discussed above. Circuit 16 can also use TES information such as peak-to-peak of the open loop TES and operates in accordance with the equations pointed out above to produce the TOS. It will be understood that the processing circuit 16 also can be embodied by a microprocessor which includes the necessary programs for providing the calculation of TOS.

The output of the adder 10 is now applied to a second gain and compesating circuit 18. This circuit provides a driving current through the tracking control 20 of the actuator. The tracking control coil 20, which is well understood to those skilled in the art, and in response to the drive current moves the objective lens in the cross-track direction. The coils 14 and 20 are positioned in the actuator 9 to cause focus and cross-track positioning adjustments a read or write spot on the disc 15a formed by light passing through the lens 15. It will be understood that it is necessary that both FES and TES require proper gain and compensation in order to maintain the focus optical spot on a track (not shown) of a disc.

Although not shown in the block diagram of FIG. 6, those skilled in the art will appreciate that it can include additional elements suitable for processing the detected signals. For example, an analog-to-digital converter, microprocessor or computer, memory, and digital-to-analog converter may be included to obtain and process digitized samples of the various signals. Furthermore, those skilled in the art will recognize that the invention may be implemented using digital servo loops.

Figure 7:
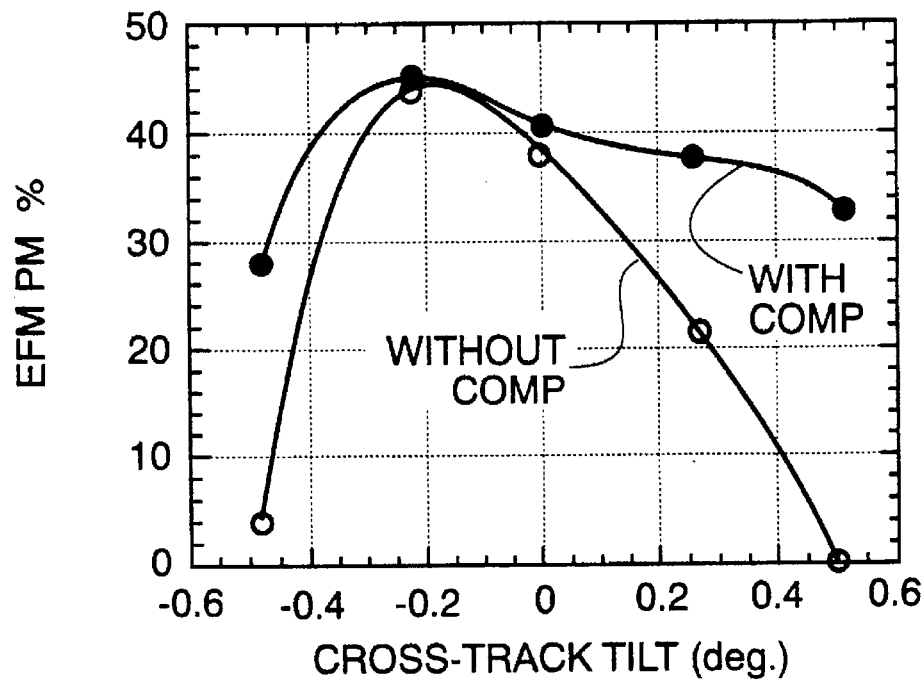
FIG. 7 shows data phase margin for two discs recorded as a function of tilt with and without the compensation technique of the present invention.

FIG. 7 shows the data phase margin (a figure of merit related to the quality of recorded data on a disc) obtained by reading back with no tilt two discs recorded with different tilts with and without the compensation technique of the present invention. FIG. 7 clearly indicates the effectiveness of the present invention.

Figure 8:
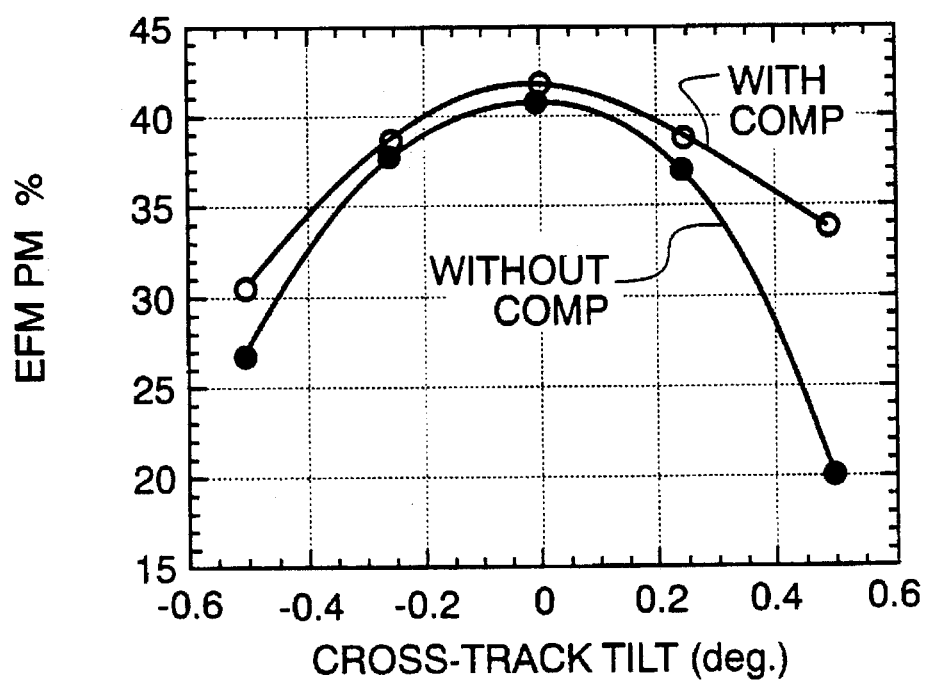
FIG. 8 shows the data phase margin as a function of tilt with and without the compensation technique of the present invention for a disc recorded on track.

The compensation technique of the present invention is also advantageous when reading back tilted discs which are otherwise recorded on-track. FIG. 8 shows the data phase margin obtained by reading back a location of a disc as a function of tilt with and without the compensation technique of the present invention. The read back track offset also uses the look up table of FIG. 5.

In summary, this invention uses focus height signal across a disc in order to determine cross-track tilt information between a disc and optical head. The cross-track tilt information signal is used in conjunction with a look up table that is particular to the optical system in use in order to determine a track offset signal.

The invention has been described in detail with particular reference to certain preferred embodiments thereof, but it will be understood that variations and modifications can be effected within the spirit and scope of the invention.

PARTS LIST 6 upper tracking error envelope
8 lower tracking error envelope
9 actuator
10 adder circuit
12 compensation circuit
15 objective lens
15a disc
14 focused control actuator coil
16 processing circuit
18 compensating circuit
20 tracking control actuator coil

We claim:

1. A method for deriving a track offset information signal to be applied to an actuator for positioning a read or write spot on a disc in response to the track offset information signal, comprising the steps of:
   a) determining a signal representative of the focus height as a function of disc radius;
   b) differentiating the focus height signal to derive a cross-track tilt signal; and
   c) using the cross-track tilt signal to produce a track offset information signal which is applied to the actuator.

2. The method of claim 1 wherein the actuator includes a moveable lens which is positioned in accordance with a current and wherein the focus height signal is determined as a function of the radius of the disc by sensing the actuator current in the focus direction.

3. The method of claim 2 wherein the differentiating step further includes differentiating the actuator current with respect to the disc radius to produce the cross-track tilt signal.

4. The method of claim 3 including transform is provided in a look-up table for producing the cross-track tilt signal.

5. The method of claim 1 wherein the actuator includes a tracking control coil, a focus control coil which positions lens in accordance with a current in the track and focus control coils and wherein the focus height signal is determined as a function of the radius of the disc by sensing the focus control coil current.

6. The method of claim 5 wherein the differentiating step further includes differentiating the focus control coil current with respect to the disc radius to produce the cross-track tilt signal.

7. A method for deriving a track offset information signal to be applied to a track control coil of an actuator for positioning a read or write spot on a disc in response to the tracking error information signal, comprising the steps of:

a) determining the upper and lower envelope levels of the tracking error signal;

b) determining a signal representative of the focus height as a function of disc radius;

c) differentiating the focus height signal to derive a cross-track tilt signal; and d) applying the cross-track tilt signal and the upper and lower envelopes of the tracking error signal to a transform which produces a track offset signal.

8. The method of claim 7 wherein the transform is provided in a look-up table representing the servomechanism of a disc drive.

* * * * *